United States Patent

[11] 3,592,375

[72] Inventors Albert W. Zemek
Binghamton;
Robert H. Holmes, Marathon, both of, N.Y.
[21] Appl. No. 839,846
[22] Filed July 8, 1969
[45] Patented July 13, 1971
[73] Assignee Universal Instruments Corporation
Binghamton, N.Y.

[54] TRANSISTOR INSERTER
17 Claims, 19 Drawing Figs.

[52] U.S. Cl. .......... 227/87, 29/203 B
[51] Int. Cl. .......... H01r 43/00
[50] Field of Search .......... 227/2, 87; 29/203 B, 203 D

[56] References Cited

UNITED STATES PATENTS

| | | | |
|---|---|---|---|
| 2,896,213 | 7/1959 | Alderman et al. | 29/203 |
| 3,081,885 | 3/1963 | Carlzen et al. | 29/203 X |
| 3,126,549 | 3/1964 | Crawford | 250/83.6 |
| 3,442,430 | 5/1969 | Ackerman et al. | 227/2 |
| 2,978,707 | 4/1961 | Runciman | 29/203 |

*Primary Examiner*—James M. Meister
*Attorney*—Fidelman, Wolffe & Leitner

ABSTRACT: A transistor inserter mechanism for inserting transistors with leads which has lead-straightening blades, guide arms to align the leads with predrilled holes in a circuit board and an ejector plunger. A slide block and spindle are mounted in a retainer for joint and relative movement during which the straightening blades first engage and disengage the leads and the guides are employed. The guides are disengaged after the leads enter the holes but prior to the operation of the ejector plunger.

INVENTORS
ALBERT W. ZEMEK
ROBERT H. HOLMES

BY Fidelman, Wolffe & Leitner
ATTORNEYS

INVENTORS
ALBERT W. ZEMEK
ROBERT H. HOLMES

BY Edelman, Wolffe & Leitner
ATTORNEYS

INVENTORS
ALBERT W. ZEMEK
ROBERT H. HOLMES

BY Fiddman, Wolffe & Leitner
ATTORNEYS

INVENTORS
ALBERT W. ZEMEK
ROBERT H. HOLMES

BY Fidelman, Wolffe & Leitner
ATTORNEYS

INVENTORS
ALBERT W. ZEMEK
ROBERT H. HOLMES

BY Fidelman, Wolffe & Leitner
ATTORNEYS

INVENTORS
ALBERT W. ZEMEK
ROBERT H. HOLMES

BY Friedman, Wolffe & Leitner
ATTORNEYS

INVENTOR.
ALBERT W. ZEMEK
ROBERT H. HOLMES
BY
Fudelman, Wolffe & Leitner
ATTORNEY

*INVENTOR.*
ALBERT W. ZEMEK
*BY* ROBERT H. HOLMES

Fidelman, Wolffe & Leitner
ATTORNEY

TRANSISTOR INSERTER

The present invention relates to a machine for processing electrical components, particularly components each having a body section with two, three or more parallel leads extending from one face thereof, especially to a machine for the automatic fabrication of circuit boards when it is necessary to insert components which need a final straightening of their lead. Electrical components such as transistors are usually mass produced each having the physical characteristics of a generally cylindrical body and a series of parallel leads extending from one face thereof. The transistors come ready for insertion directly into an automatic insertion machine, the individual components needing only a final lead-straightening operation before insertion.

Although a number of machines exist for inserting transistors into circuit boards and the like, a prior operation of straightening the leads must be performed before the machines can be inserted directly into the automatic insertion machine. Thus, a separate mechanism must be employed which entails not only a time consuming, a costly secondary operation but also the possibility of the leads being misaligned in transport from the straightening mechanism to the automatic insertion machine.

A further problem encountered is versatility of component design. Although components with the leads extending from one face thereof are fairly well standardized by now, many companies make transistors of a slightly different configuration, thus necessitating different straightening machines for each component and in some cases a completely different inserter head assembly on the automatic insertion machine. Many transistor insertion machines now in service can handle only the products of one manufacturer without a major change one in portions of the machine.

It is a general object of the present invention to provide an insertion lead for an automatic insertion machine that will meet all of the above desiderata.

A more specific object of the present invention is to provide a transistor insertion lead having means to straightening the leads during the insertion operation.

Another object of the present invention is to provide a component insertion lead having means to engage the leads of the components at the commencement of the insertion operation and then disengage during the final stage to allow for insertion.

It is a further object of the present invention to provide an insertion lead for an automatic insertion machine capable of handling and straightening all sizes of transistors.

A further object of this invention is to provide an insertion lead for an automatic insertion apparatus that is accurate and reliable yet inexpensive.

Other objects and the nature and advantages of the present invention will be apparent from the following description taken in conjunction with the accompanying drawings, wherein.

Figure 10:
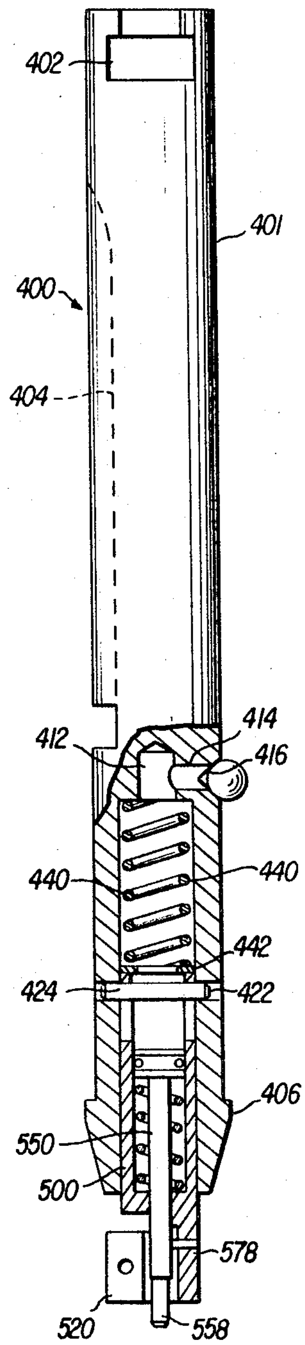
FIG. 10 is a side view of the spindle.
Figure 10B:
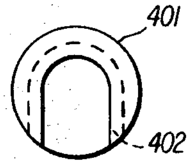
Figure 10A:
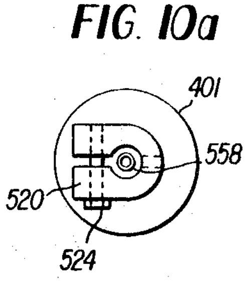
Figure 11:
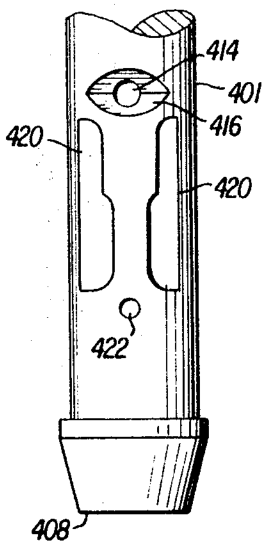
Figure 12:
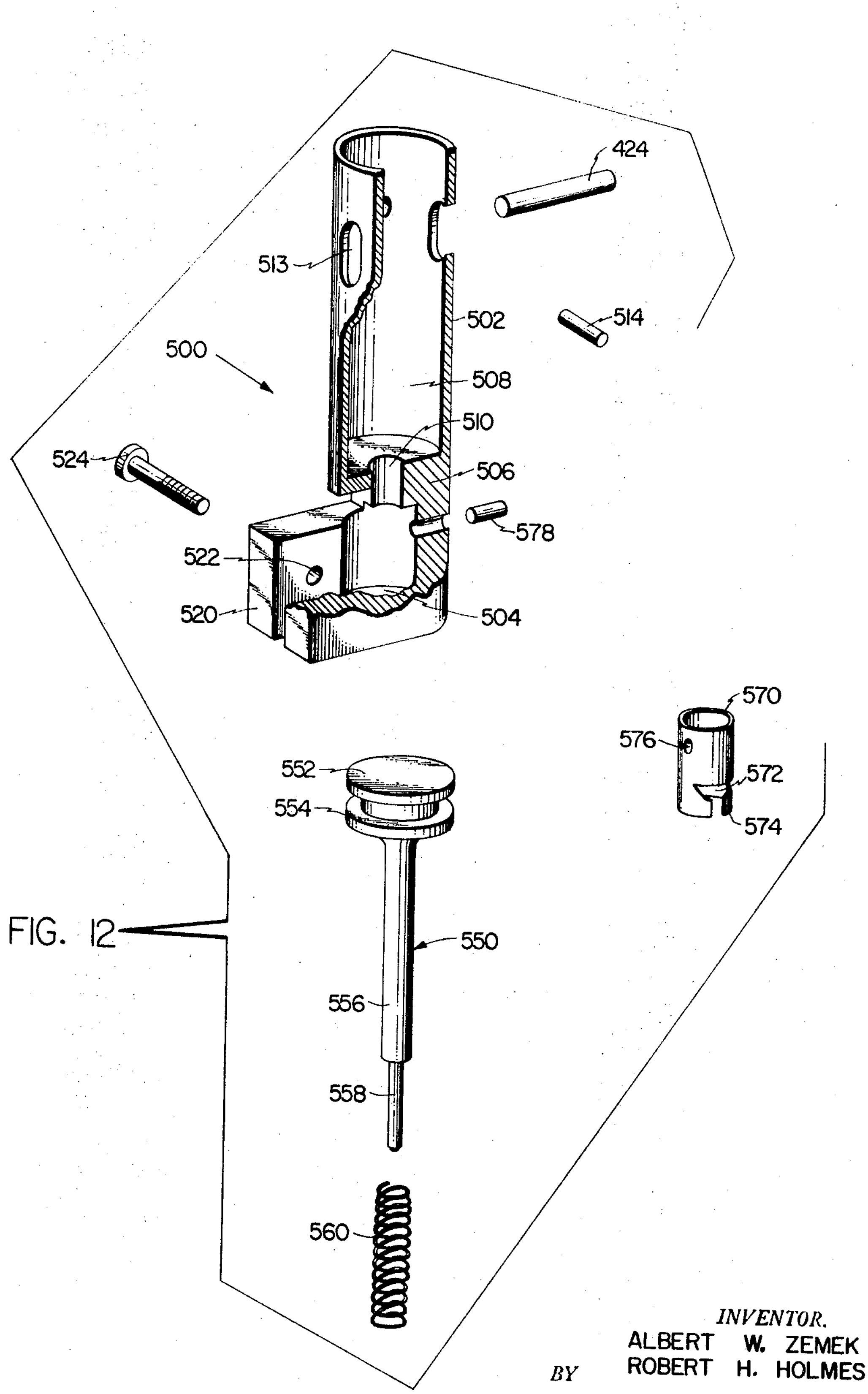
Figure 14:
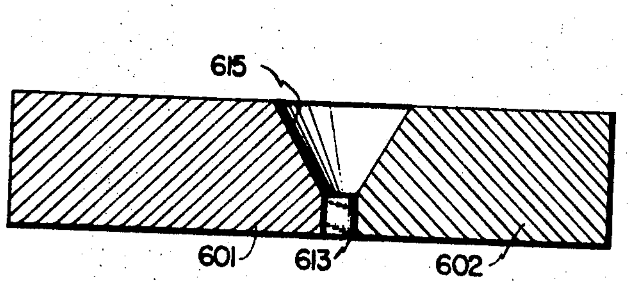
Figure 15A:
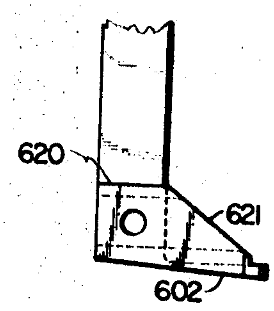
Figure 15B:
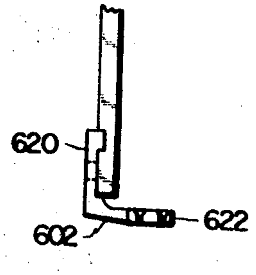
Figure 13:
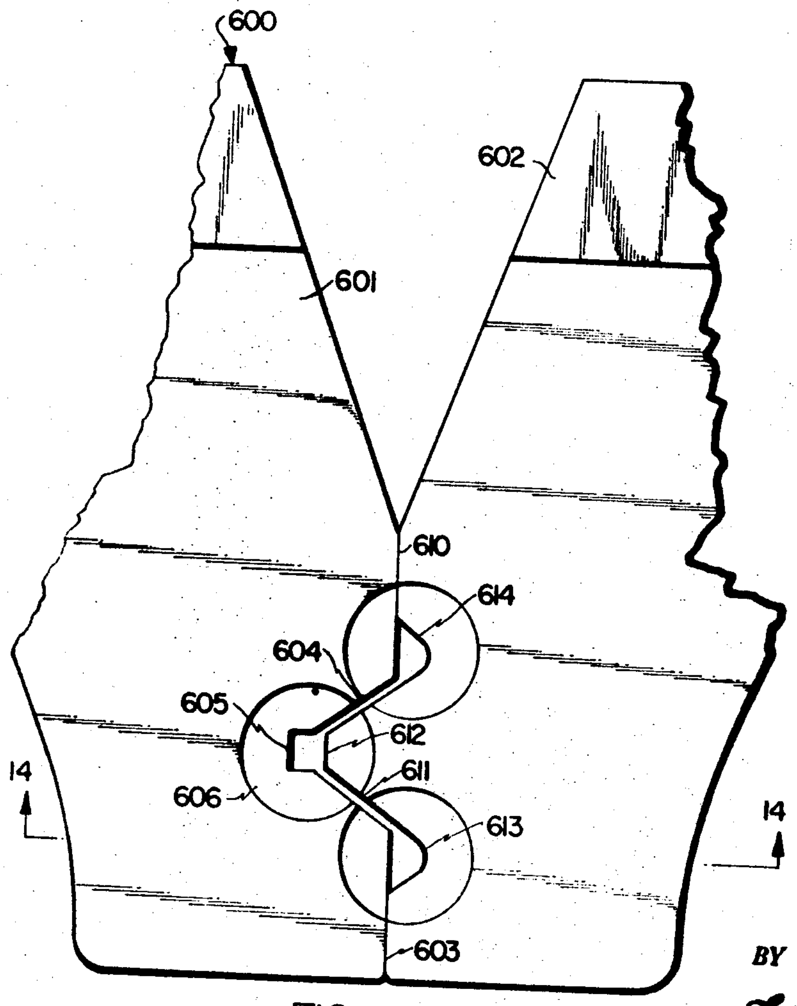

FIG. 10*a* is a bottom view of the spindle shown in FIG. 10;

FIG. 10*b* is a top view of the spindle shown in FIG. 10;

FIG. 11 is a partial rear view of the spindle showing the slots that control the operation of the guide arms;

FIG. 12 is a perspective view of the collet adapter with portions removed for illustration and with the piston pin in exploded view;

FIG. 13 is a plan view of the guide edges meshed to engage transistor leads;

FIG. 14 is a cross section view of the guides edges taken along line 14–14 of FIG. 13;

FIG. 15*a* is a front view of one guide and its relation to its guide arm;

FIG. 15*b* is a side view of the guide of FIG. 15*a*; and

Figure 15C:
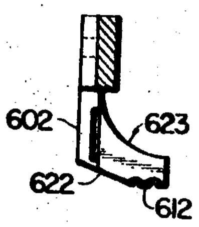

FIG. 15*c* is a plan view of the guide of FIG. 15*a*.

GENERAL DESCRIPTION OF THE INSERTION MACHINE

Figure 1:
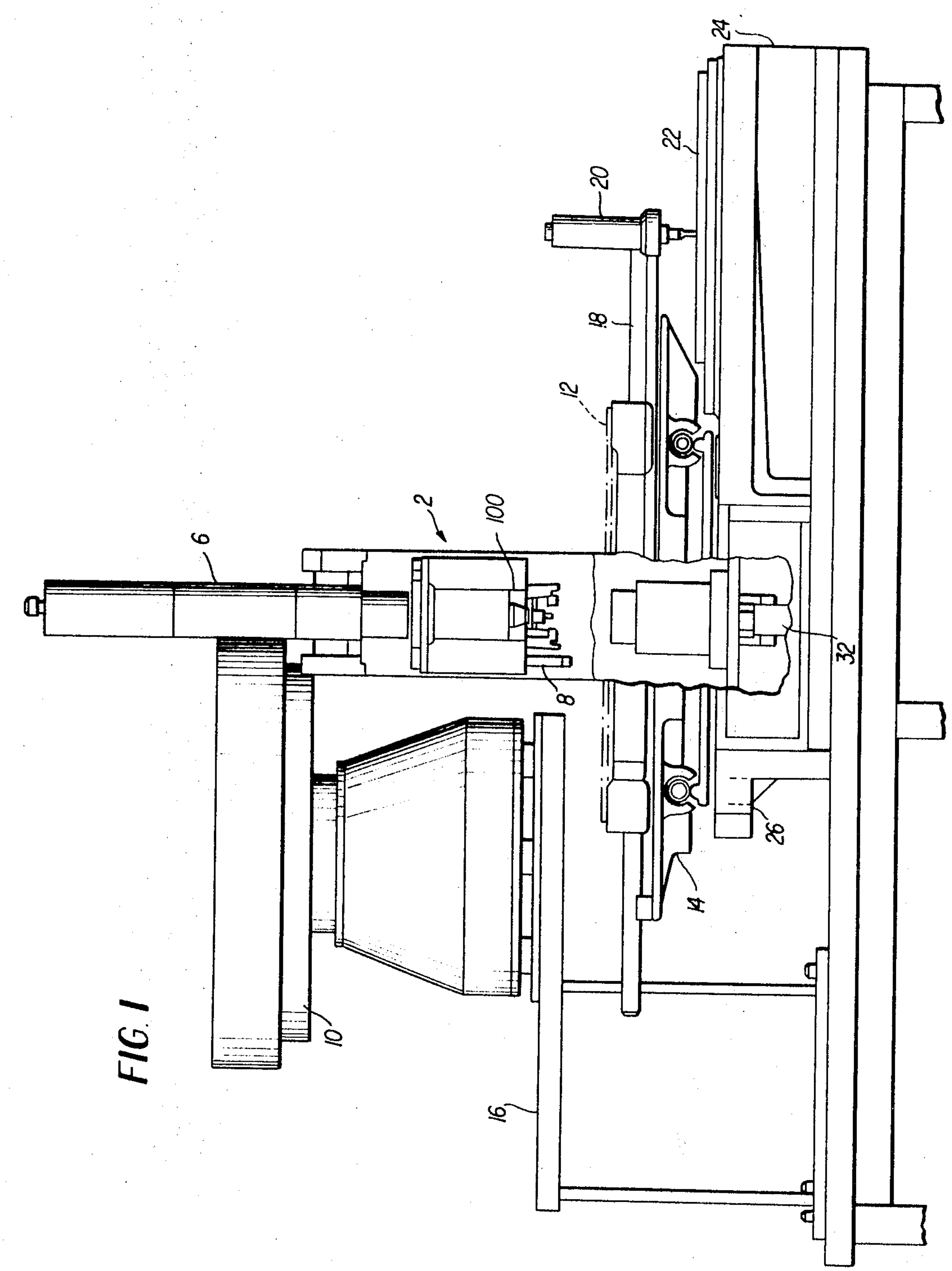
FIG. 1 is a front view of an automatic insertion machine in which the present invention is mounted.

As shown in FIG. 1, the insertion apparatus consists of an insertion machine 2 having an insertion head assembly 100, an air cylinder 6, a component feed mechanism 8, a vibratory bowl feed 10, a work holder 12 for holding circuit boards and the like during insertion operations and an X–Y coordinate table 14. All of the foregoing is supported on main frame 4. A secondary frame 16 supports the vibratory bowl 10 on frame 4. Extending from work holder 12 is an arm 18 on the end of which is mounted a stylus 20. Immediately below the stylus 20 is a template-supporting member 22 mounted on a base member 24. Mounted on a subframe 26 is a clincher mechanism 30 powered by an air cylinder 32.

The operation of the device is best described in the following manner:

The vibratory bowl 10 feeds components to the feed mechanism 8 which, in turn, transfers it to the insertion head assembly 100. The operator engages a hole in a template representing the circuit board on work holder 12 with stylus 20 and the insertion assembly comes down and inserts a component into the circuit board while, simultaneously, the cylinder mechanism 30 clinches the leads on the bottom side of the circuit board. The operation is repeated until the required number of components have been inserted into the board.

As the assembly 100 begins its movement, it engages the leads of the component with straightening blades, straightens them, and then guides them down by the clamping action of the guides until the leads enter predrilled holes in the circuit board. The component up to this point is held in a collet which trips it tightly against rotative and vertical movement. The component is punched out of the collet by the action of a piston pin and pushed down so that the base surface of the component head is flush with the upper surface of the circuit board.

DESCRIPTION OF THE INSERTION HEAD

Figures 2, 3, 4:
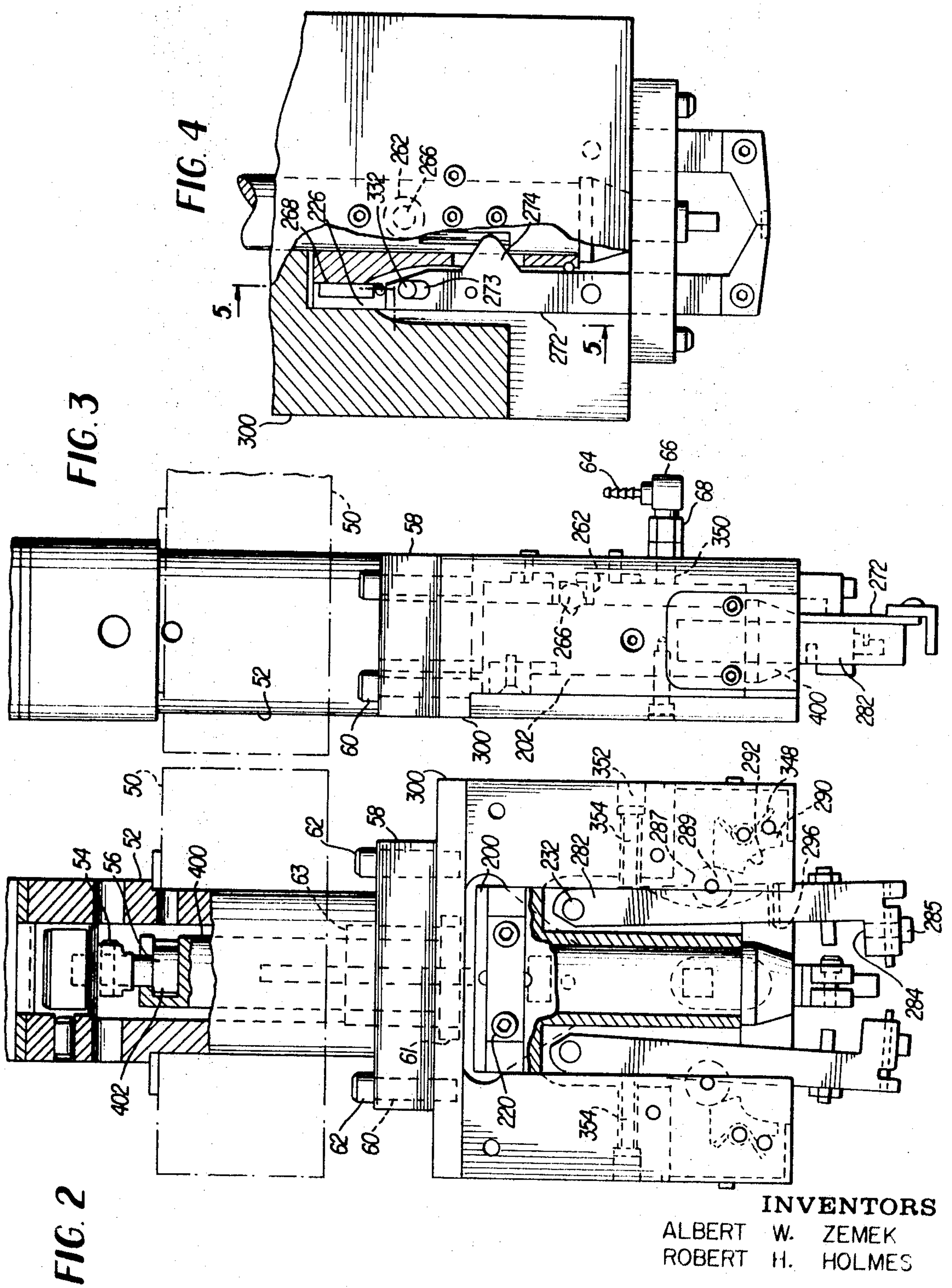
FIG. 2 is a front view of the insertion head assembly with the slide retainer partially broken away to show the straightening arms.
FIG. 3 is a side view of the insertion head assembly shown in FIG. 2.
FIG. 4 is a partial rear view of the insertion head assembly shown in FIG. 2 with the slide retainer and slide block in section to show the guide arm.

Looking at FIGS. 2 and 3, the insertion head assembly is seen to be mounted on a frame member 50. One of the essential parts of the insertion head is a spindle cylinder 52 having a spindle 400 mounted therein for vertical nonrotative movement. An air cylinder (not shown) is mounted on top of the spindle cylinder and operates a piston rod 54, the bottom of which is seen in FIG. 2. The piston rod has a cylindrical adapter 56 which fits into a recess 402 on the top of spindle 400. The base of the cylinder 52 consists of a flange 58 having two mounting holes 60 therein. The cylinder 52 is secured by means of bolts 62 or the like to a slide retainer 300.

Mounted for vertical sliding movement within slide retainer 300 is slide block 200. Spindle 400 is slidable within the slide block 200 in a manner to be described. As seen in FIG. 3, there is an air hose fitting 64 fitted to an L-filling 66 which, in turn is connected to a short coupled 68 filled into the rear face of slide retainer 300.

Slide Block

Figure 7:
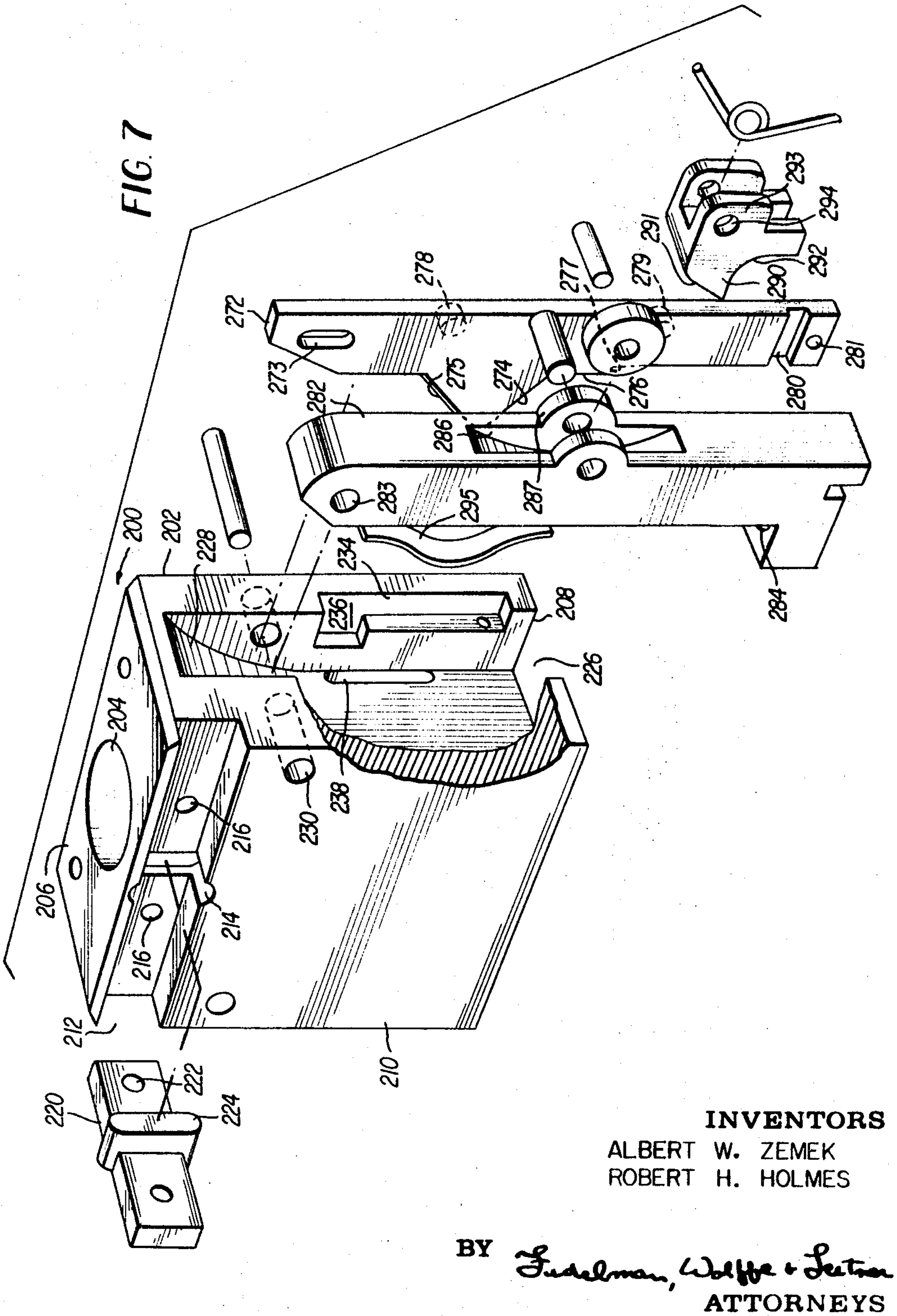
FIG. 7 is a perspective view of the slide block with portions removed and a guide arm, a straightening arm, the spindle alignment key, the straightening arm dowel and the straightening arm cam in exploded view.

Slide block assembly 200 consists of a rectangular slide block 202 having a cylindrical bore 204 drilled through the center of top surface 206 to the center of bottom surface 208 in which spindle 400 is adapted to slide. On the front surface 210 of block 202 is a rectangular channel 212. In the center of channel 212 is a notched keyway 214 which extends all the way into bore 204. Adjacent the keyway 214 are two mounting holes 216. As seen in exploded view, key plate 220 is generally rectangular with holes 222 and key 224. The key plate 220 is of the same dimensions as channel 212 and fits into it. The key 224 extends through keyway 214 and engages a slot 404 in spindle 400, thus preventing the spindle from rotating but allowing relative vertical movement. The sides of block 202 are cut out to form channels 226. The channels are generally rectangular at the lower ends but arcuately taper at the top as at 228. The walls of the channels are drilled to provide holes 230 for mounting dowels 232. As best seen in FIG. 7, portions of the block adjacent the channel are cut away to provide a long rectangular recess 234 and a smaller recess 236 generally square in front view. The purpose of these recesses will be described later.

Figure 5:
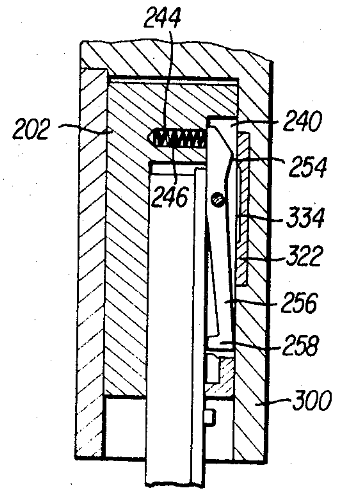
FIG. 5 is a sectional view taken along line 5–5 of FIG. 4.
Figure 8:
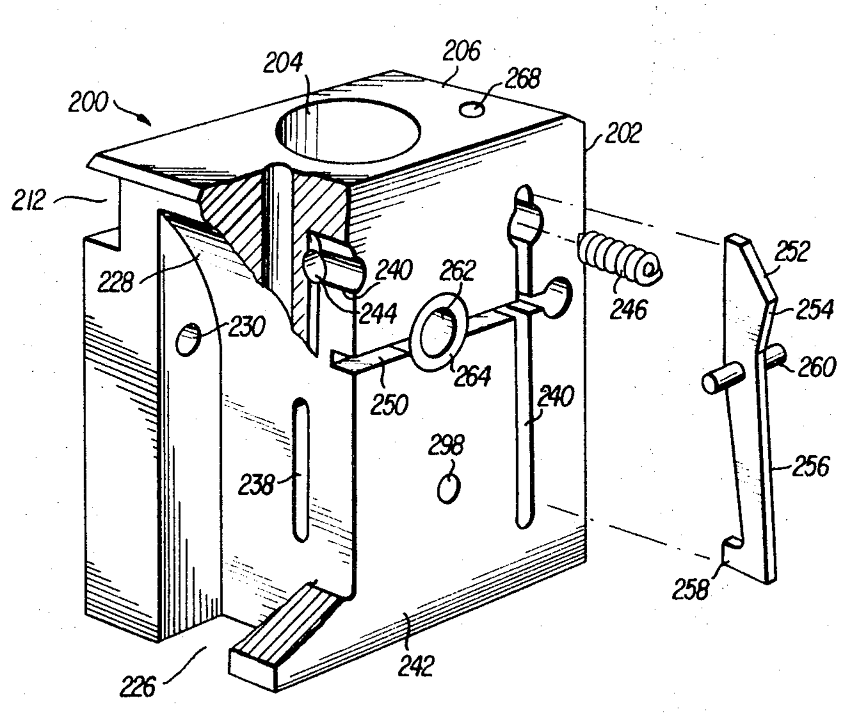
FIG. 8 is another perspective view of the slide block with portions removed and one sear in exploded view.
Figure 9:
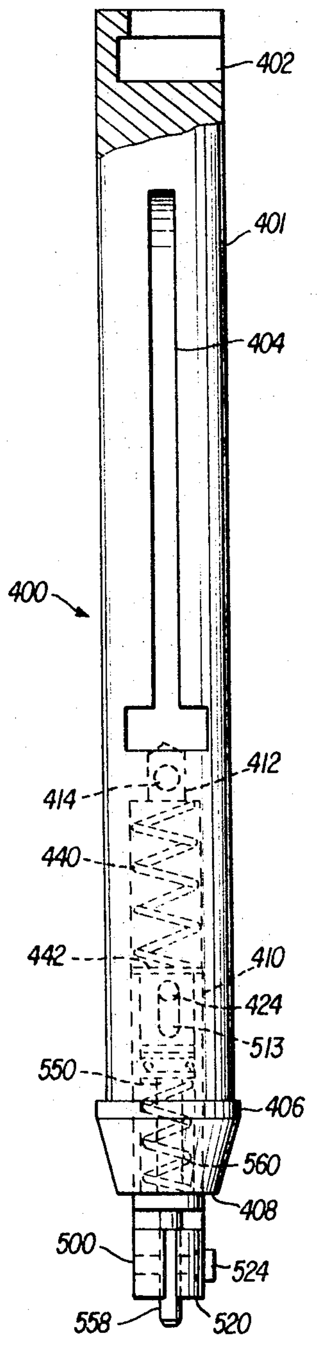
FIG. 9 is a front view of the spindle.

In the inner walls of the channels 226 are slots 238 in open communication with bore 204 and with vertical sear slots 240 located on the rear surface 242 of the block. As seen in FIG. 5, the slots are in communication with holes 244 in which are fitted compression springs 246. A slot 250 extends horizontally across the rear surface 242 of the slide blocks. Mounted in each slot 240 is a sear 252. As seen in FIGS. 5 and 8, the sears have a raised portion 254 and an elongated arm portion 256 with a projection 258 on the end thereof. A dowel 260 is mounted in the pivotal center of each sear. The dowels are mounted in slot 250 but are not secured to block.

The inner face of the slide retainer 300 keeps the sears in position. In the center of slot 250 is a small cylindrical bore 262 in communication with bore 204. As seen in FIG. 3, bore 262 has a bushing liner 264 therein and a ball 266 residing in the bushing. The ball has a diameter slightly in excess of the depth of bore 262 from surface 242 to bore 204, the purpose of which will be described later. Holes 268 extends from the top surface 206 of block 202 into channels for the purpose of retaining a plunger and spring 270, best shown in FIG. 4.

Looking now at FIG. 7, a guide arm 272 is seen in exploded view. Arm 272 has a slot 273 in the top thereof and a projection 274 on its front edge. The projection is beveled at 275 and tapers downward to a slightly raised edge portion 276 ending at step 277. Studs 278 and 279 are mounted on one side of arm 272 and a mounting channel 280 extends across the bottom thereof. Between the channel 280 and the lower edge is a mounting hole 281.

Arms 272 are mounted in channels 226 of block 202 by means of dowels 232 which extend through slots 273. Projections 274 of members 272 extend through slots 238 and into bore 204.

Also mounted on dowels 232 by holes 283 are straightening arms 282. The lower ends of arms 282 have a channel (not shown) and a straightening-blade screw-mounting hole 284. The straightening blades are held in position by a bolt such as 285 in FIG. 2 passing up through the blades and into arms 282. The rear faces of arms 282 are notched out as at 286 and have drilled ears 287 adapted to receive dowels 288. Mounted on dowels 288 are cam rollers 289. Cam rollers are adapted to engage dogleg cams 290, shown also in exploded view in FIG. 7. Cams 290 have a generally planar camming surface 291 merging into a concave face 292. The cams 290 are essentially two camming-plate portions 293 joined together by the surface 291. The plate portions 293 have mounting holes 294 therein for mounting the cam on slide retainer 300. The front faces of arms 282 are chambered to receive a spring 295 secured to the arms by machine screws 296 of the like. Holes 297 are located near the end of arms 282 for holding swing adjustment screws.

Block 202 has a hole 298 in rear surface 242 which extends into bore 204. The purpose of this hole is to admit air into bore 204 to act on a piston pin mounted within spindle 400.

Slide Retainer

Figure 6:
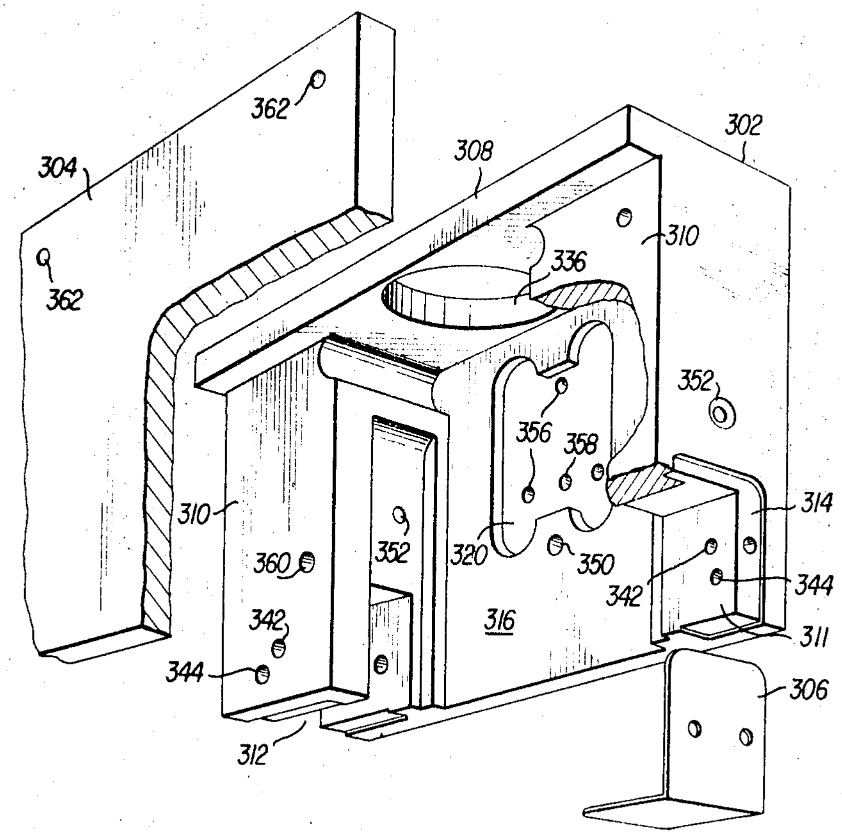
FIG. 6 is a perspective view of the slide retainer with a portion removed to show the entire configuration and the cover and plate in exploded view.

As seen in FIG. 6, slide retainer assembly 300 consists of a retainer block 302, a retainer block plate 304 and two L-shaped covers 306.

Block 302 is essentially rectangular with a rectangular portion removed from the center thereof to provide an area for receiving the slide assembly 200. A raised portion 308 extends across the front surface. Extending down from this are leg portions 310, one of which is shown cutaway for illustrating the inside of the slide retainer. Each leg portion 310 is slotted as at 312 to provide an area for mounting cam 290 on a dowel (not shown). The slotted areas are substantially square and are chambered on the sides and bottom as at 314 to provide a recess for receiving cover 306. Rear wall 316 has a relieved area 320 therein in which is mounted a sear reset plate 322 (see FIG. 5). As shown in FIG. 5, sear reset plate has grooves 334 therein to receive projections 254 of sears 252 to when the slide block 202 moves down relative to slide retainer assembly 300.

The top of 302 has a bore 336 therein of a larger diameter than spindle 400. This is to accommodate a bushing 63, as shown in FIG. 2, and an insert 61.

On the inner surfaces of leg portions 310 are channels 340 which, together with channels 226 in slide block 202 provide an area in which both pairs of arms, 272 and 282, may pivot. The lower regions of leg portions 310 have two sets of holes 342 and 344. Holes 342 receive dowels on which cams 290 are pivotally mounted and holes 344 receive dowels 346 (FIG. 2) which limit the pivot of the cams. The cams are biased against dowels 346 by springs 348.

Located in sides of retainer block 302 are holes 352 for accommodating adjustment screws 354. Screws 354 regulate the amount of outward swing of arms 282 as illustrated in FIG. 2.

In the area 320 of block 302 is a hole 350 for admitting air from coupling 68.

Also in area 320 are three sear-reset-plate-mounting holes 356. Located in the middle of all the mounting holes is a hole 358 for mounting a V liar plunger. The sear reset pad 332 has a hole in line with 358, the hole in the reset pad being reamed to allow ball 266 to seat therein, stopping the downward movement of the slide block assembly 200 while allowing spindle assembly 400 to continue. When the open notch of the spindle assembly that normally engages the ball reaches a point level with hole 298 and in block 202 and hole 250 in retainer block 302, air is shot into the spindle and forces the piston down to eject a component.

Located in the front surfaces of leg portions 310 are mounting holes 360 which align with holes 362 in plate 304 to allow the latter to be secured to block 302. Covers 306 may be secured to leg portion by screws, bolts or equivalent means. Holes 364 in the base of 302 are for mounting a component feed mechanism to the insertion head assembly of a well-known variety. The feed mechanism forms no part of this invention and is not described.

Spindle Assembly

The spindle assembly is shown in FIGS. 9, 10, 10*a*, 10*b* and 11. It consists of a solid spindle rod 401 with a recess 402 at the top thereof for receiving the end of a piston rod. A channel 404 extends from near the top of the rod down to a point slightly below midpoint of the rod. The lower end of rod 401 has a flange 406 portion which tapers down to a end face 408. End face 408 has an axial cylindrical bore 410 therein which extends up to a point just of the bottom of channel 404. A smaller diameter shallow axial bore 412. As seen in FIG. 10, a radial bore 414 extends out from bore 412 to the surface of rod 401. The area of the point of juncture between the surface of rod 401 and bore 414 is removed so as to provide a notch 416. Notch 416 receives the tip of ball 266. Located below and slightly to either side of notch 416 are grooves 420. The grooves 420 are narrow at their upper extremities and wide at the lower extremities. If seen in cross section, the grooves 420 would appear L-shaped with the base of each L being colinear with the other.

Located just below the grooves and in line with bore 414 is a bore 422. Received with bore 422 is a dowel pin 424 which is adapted to limit the vertical travel of collet adapter 500 assembly within bore 410.

Collet Adapter and Piston Pin

As seen in perspective in FIG. 12, the collet adapter assembly 500 comprises a generally cylindrical adapter 502, the top and bottom portions of which are tubular. Bore 504 extends up to a central portion 506. Bore 508 extends down to central portion 506. Portion 506 has a small-diameter cylindrical passageway 510 therebetween.

The top of adapter 502 has a pair of slots 513 therein which enables the adapter to travel vertically up and down on dowel 424 in spindle body 401. The adapter is drilled as at 512 to receive pin 514. Pin 514 limits the upward travel of piston pin 550 within bore 508.

The lower end of adapter 502 is formed to have a break in the inner wall of bore 504 and has lugs 520 extending therefrom. The lugs are drilled at 522 to receive a machine screw 524 or the like. Collet 570, only shown as an example of a type of collet, fits into bore 504 and is clamped thereby fastening lugs.

Collet 570 is generally of tubular springy stock and has a portion cut away as at 572 so as to provide a clip portion 574. The collet may have a hole 576 for engagement by a pin 578 passing through the rear of adapter 502 to prevent rotation of the collet.

Piston pin 550 is adapted to be mounted with bore 508 and has two flanges, 552 and 554 adapted to accommodate an O-ring therebetween. Piston 550 has a rod portion 556 which ends in a small-diameter plunger tip 558. A compression spring 560 surrounds rod 556 and abuts against flange 554 urging the piston pin up against pin 514 in the adapter 502.

A compression spring 440 is filled within bore 410 of spindle 401 and acts against a washer 442 filled to the top of adapted 502.

Guide Arms

Referring now to FIGS. 13, 14, 15*a*, 15*b* and 15*c*, the guides are generally designated as 600. There are two guides, 601, and 602 which mesh to straighten and guide the leads of a transistor until the leads enter predrilled holes in a printed circuit board.

As shown in FIG. 13, guide 601 has a generally flat edge 603 with a notched portion 604 in its center. Notch 604 terminates in slot 605. The upper portion of slot 605 is flared or beveled as at 606 to provide a funneling function for the end of a transistor lead entering slot 605. Guide 602 has a flat edge 610 having a projection 611 thereon. Projection 611 is generally triangularly shaped with the apex flattened as at 612 to provide a fourth wall for slot 605 when projection 611 meshes with notch 604. Two notches, 613 and 614, are formed on edge 610 at each side of projection 611 for receiving the remaining two leads of a transistor. As shown in FIG. 14, these notches are flared at the upper portion as shown by 615. The flaring around 605, 613 and 614 is formed on both of the guides. Of course, it is understood that any number of slots or notches can be provided depending on the number of leads of the transistor. FIGS. 15*a*, 15*b* and 15*c* show the general configuration of guide 602 and its relationship to guide arm 272. Guide 602 has a vertical section 620 with a sloping edge 621. Flat portion 622 of guide 602 curves as at 623 to mesh with guide 601.

Operation

The operation of the inserter will now be described in detail. A transistor or like electronic component is fed by a conventional transfer mechanism (not shown) toward collet 570 and is snapped into the clip portion 574. The transfer mechanism then moves away from the collet.

The slide block 200 then moves downwardly through the actuation of spindle cylinder 52. As block 200 moves downwardly the action of cams 290 on the rollers 289 of straightening arms 282 forces the arms to swing inward toward the collet 570. As they do, the straightening blades (not shown) on the ends of the arms mesh to straighten the leads of a transistor held within collet 570. Continued downward movement of the block allows the rollers 289 to ride off the flat surfaces 291 of the cams 290 and snap into the concave surfaces 292, thus allowing the arms 282 to swing away due to the biasing effect of springs 295.

When the block has reached the limit of its downward travel, the leads of the transistor have entered and are encompassed by the slot 605 and notches 613 and 614 of guides 601 and 602. At this point, the spindle rod 401 begins its downward travel relative to block 200. Ball 266 is nudged into the hole 262 by the continued downward force on the spindle and the fact that the block cannot move any further. During the downward movement of the spindle, projections 274 of guide arms 272 ride in grooves 420 of the spindle assembly 420 until the spindle movement continues beyond the upper extremity of the grooves. When this occurs, the arms 272 are forced outwardly. The guides accordingly are moved away from the leads which at this point should be just entering predrilled holes in the circuit board. This is to afford room for the body of the transistor to be thrust toward the circuit board. During the outward movement of the arms 272, the projections 258 are moved forwardly through slots 240 to engage the area in front of the inner edges of arms 272 (see FIG. 5). This is possible because the previous downward movement of the block has moved projections 254 of sears into the area above relieved area 320 of the slide retainer. The spring 246 tends to pivot the sear 252 and projections 258 engage under the forward edges of projections 274 on guide arms 272. The purpose of this is to insure that the guide arms stay pivoted away from the collet until the spindle has ceased its upward relative return movement of the return cycle and the slide block and spindle are moving upward as a unit.

Returning now to the insertion part of the cycle, the spindle, after the guide arms 272 have moved out of the way, comes to a stop. Where the spindle stops, aperture 414 is directly opposite hole 298 in block 200 and hole 350 in the retainer leading from a source of compressed air. Any suitable switch means (not shown) is employed to activate the compressed air at this point. The air enters bore area 410 and the inner area of collet 500 and pushes on the top surface of piston 550. Piston 550 moves downward against spring 560 and plunger tip 558 ejects the transistor down until the body of it is flush with the circuit board. The cycle then repeats itself for each transistor.

Obviously, the mechanical structure and means are but one design for facilitating the relative movement of the straightening means, the guides and the ejector means. Other suitable arrangements may be used without departing from the spirit of the invention.

What we claim is:

1. An apparatus for inserting electrical components into a circuit board and the like comprising a feed means for said electrical components, an insertion head collet means for receiving the components from the feed means, pivoted straightening means for straightening the component leads, means for guiding the leads of the component to insure proper alignment during insertion, means for moving said collet means downward for insertion of the component and pivoting said straightening means out of the path of said collet means, means for moving said guide means out of the path of said collet means during the insertion, and means to eject the component from the collet means, whereby the insertion of the component is accomplished.

2. An insertion head assembly adapted for use in an insertion apparatus for inserting electrical components with leads into a circuit board, said insertion head assembly comprising a retaining means, slide means mounted to said retaining means for vertical movement, said slide means having component-lead-straightening means and component lead guide means depending therefrom, spindle means mounted in said slide means for vertical movement relative to said slide means, receiving means mounted on said spindle means for engaging an electrical component, ejection means associated with said spindle means for ejecting a component, means for causing the straightening means and guide means to move out of the path of said component-receiving means during an insertion cycle.

3. An insertion head assembly as set forth in claim 2 wherein said component-lead-straightening means consist of a pair of arms pivotally mounted to said slide means, lead-straightening blades mounted adjacent the lower extremity of each of said arms and camming means associated with said retaining means for causing said arms to pivot during an insertion cycle.

4. An insertion head assembly as set forth in claim 2 wherein said component lead guide means consists of a pair of arms mounted to said slide means for pivotal and limited vertical movement, guide plates mounted adjacent the lower extremity of each of said arms, said guide plates having relatively flat portions with abutting edges and aperture means thereon, camming means associated with said guide arms and said spindle for causing said arms to move during an insertion cycle.

5. An insertion head assembly as set forth in claim 4 wherein said aperture means in the guide plate flat portions are formed by a notch terminating in a slot in the abutting edge of one of said plates, and a meshing projection between two notches on the abutting edge of the other plate, the projection adapted to mesh with the notch on the first plate to form one aperture, the edge of said first plate and the notches of the other plate abutting to form two additional apertures, the areas of both plates adjacent said apertures being relieved to form guide surfaces sloping toward the respective apertures.

6. An insertion head assembly as in claim 2 wherein the slide means consists of a block having a central vertically extending passage therethrough in which said spindle means is mounted for vertical movement, said block also having channels in opposite sides thereof in which said straightening means and said guide means are pivotally mounted, the means causing said guide means to move out of the path of the component-receiving means consisting of projections extending from said guide means, slots extending from said channels into said central passage, and vertical grooves on said spindle means whereby said projections normally ride in said grooves until said spindle means is projected downwardly relative to said block whereupon the projections are forced out of said vertical grooves forcing the guide means to move away from the path of the component-receiving means.

7. An insertion assembly as set forth in claim 2 wherein said retaining means has a hollowed rectangular area in which said slide means is mounted, said means causing said lead-straightening means to move out of the path of said component-receiving means consisting of rollers on said straightening means, pivoted spring-loaded cams on said retaining means, said cams having a first flat camming surface and an adjacent second arcuate camming surface whereby as the slide means moves downwardly the first camming surfaces coact with the rollers to force the straightening means into the area immediately below the component-receiving means to straighten the component leads and upon further downward movement of said slide means the rollers coact with said arcuate camming surfaces to move the straightening means out of the path of said component-receiving means.

8. An insertion head assembly as set forth in claim 2 wherein said slide means has a vertical centrally extending passage therethrough in which said spindle means consisting of an elongated rod, the lower portion being hollow, said component-ejecting means consisting of a cylinder and piston means in said hollow portion, a source of air pressure, and value means connecting said source with said cylinder and piston means whereby upon activation of said value means, air pressure forces the piston means downward to eject a component from said receiving means.

9. An insertion head assembly as set forth in claim 8 wherein said cylinder means consists of a hollow collet adapter mounted for limited movement in the hollow portion of said spindle, said adapter having a collet clamp at its lower extremity, said component-receiving means consisting of a collet clamped in said collet adapter means, a first resilient means biasing said adapter means downwardly, a second resilient means biasing said piston means upwardly, slots in said collet adapter, a pin extending through said slots into said spindle whereby said adapter movement is limited by the length of the slots and the pin provides a limit stop for upward travel of said piston means.

10. An insertion head assembly for inserting electrical components having leads into electrical printed circuit boards with existing insertion apertures and the like, comprising:

a. means for holding said components with leads extending in the direction of the circuit board, b. means to propel said holding means toward said circuit boards, c. means to straighten said leads during a first part of said insertion cycle.

d. means to guide said leads during a later part of said insertion cycle, and e. means to eject said components from holding means into the circuit boards.

11. An insertion head assembly as set forth in claim 10 wherein said means for propelling said holding means includes:

f. a retaining means, g. a slide means mounted for relative movement in said retaining means, h. a spindle means mounted for relative movement in said slide means, whereby relative movement is effected between said retaining means, said slide means and said spindle means during an insertion cycle.

12. An insertion head assembly as set forth in claim 10 wherein said means to straighten said leads comprises:

f. depending arms pivotally mounted to said assembly, g. straightening blades mounted on the ends of said arms, and h. cam means on said assembly to first swing the arms into a lead-straightening position and then away during an insertion cycle.

13. An insertion head assembly as set forth in claim 10 wherein said means to guide said leads comprises:

f. guide arms depending from said assembly and mounted thereon for pivotal and limited linear movement, g. guide plates having edge portions with funnel-shaped apertures in one edge thereof, h. said edges normally in abutting relationship, i. camming means associated with said arms and said propelling means to move said plates away from the insertion path during the latter portion of the cycle.

14. An insertion head assembly for use in inserting electrical components into predrilled holes in printed circuit boards comprising:

a. a retaining block having a hollow open-ended chamber portion, b. a slide block mounted for linear movement in the central part of said chamber portion, c. said slide block having channel portions on opposite vertical sides thereof and a vertical aperture extending therethrough, d. component-lead-straightening means pivotally mounted to said slide block in said channel portions, e. component lead guide means mounted for pivotal and limited linear movement in said channel portions adjacent said component-lead-straightening means,
f. spindle means extending through said slide block vertical aperture and one end of said retaining block for connection to a power means the other end being hollow,
g. a component-holding means mounted on the end of said spindle means, and
h. ejector means mounted in the hollow end of said spindle for ejecting a component from said holding means.

15. An insertion head assembly as set forth in claim 14 and further including:

i. a roller and cam means adapted to first pivot the lead-straightening means into straightening means in the first part of an insertion cycle and then to pivot the straightening means out of straightening position.

16. An insertion head assembly as set forth in claim 14 and further including:

i. a groove and projection camming means adapted to pivot the lead guide means away from a guide position during the latter portion of the insertion cycle.

17. An insertion head assembly as set forth in claim 14 wherein said ejector means comprises:

i. a collet adapter in the hollow end of said spindle means,
j. a piston with an ejector pin mounted for linear movement in said collet adapter.
k. a source of fluid pressure,
l. means connecting said fluid pressure source with said piston, whereby upon activation, the fluid pressure causes said piston and pin to eject a component from said component-holding means.